Nov. 28, 1967  J. W. HARRISON  3,355,010
HEAT SHRINKABLE PACKAGE
Filed March 16, 1966
Fig. 1.
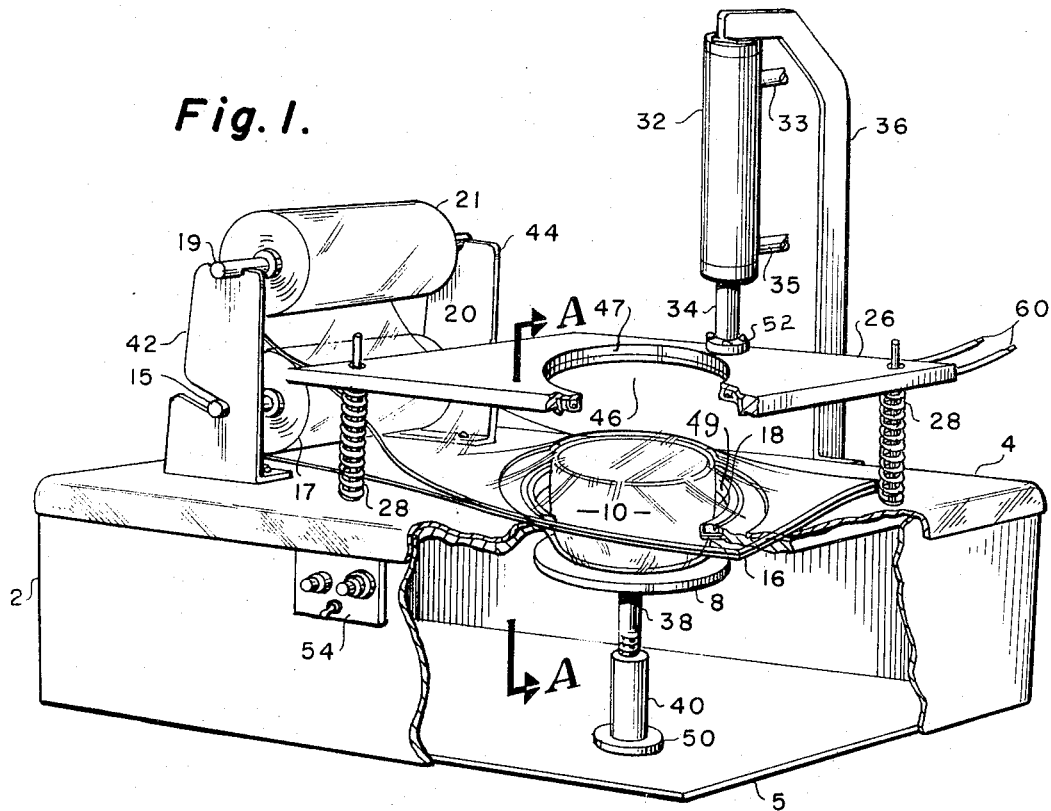
Fig. 2.
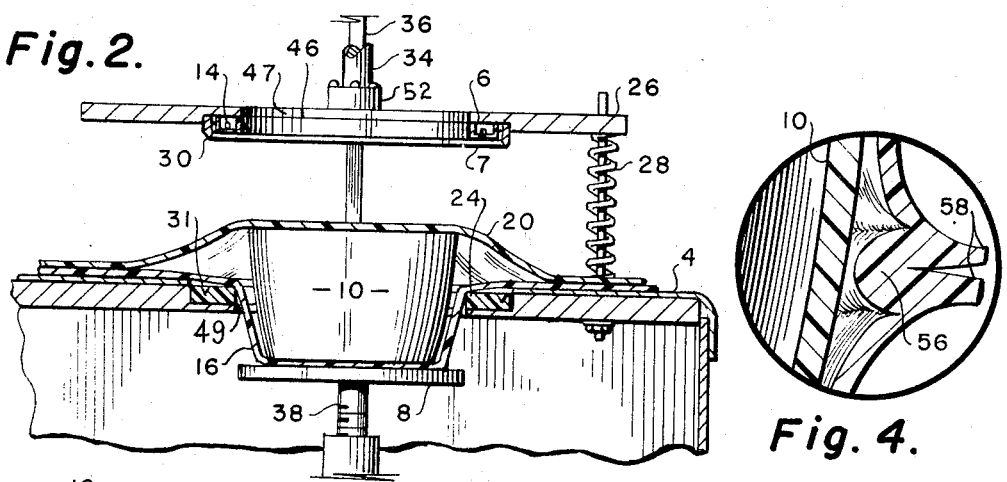
Fig. 3.
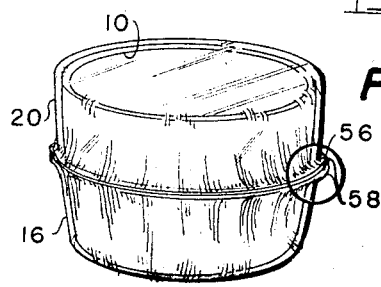
Fig. 4.

United States Patent Office 3,355,010
Patented Nov. 28, 1967

3,355,010
HEAT SHRINKABLE PACKAGE
John W. Harrison, Winchester, Mass., assignor to W. R. Grace & Co., Duncan, S.C., a corporation of Connecticut
Filed Mar. 16, 1966, Ser. No. 541,891
3 Claims. (Cl. 206—46)

ABSTRACT OF THE DISCLOSURE

A package wherein a product is enclosed by a first biaxially oriented, heat shrinkable film tightly covering the upper portion of the product and a second biaxially oriented, heat shrinkable film tightly covering the lower portion of the product, said first and second films being heat sealed together about the periphery of the product intermediate its end portions so that the seal forms a bead completely encircling the product with a tighter fit than the remaining portions of the films.

---

This invention relates to a package employing flexible heat shrinkable film. In one aspect the invention relates to a method for enclosing a product in a heat shrinkable film.

The use of heat shrinkable films is well-known in the packaging industry for providing protection for various types of products including food, toys, phonograph records and the like. These heat shrinkable films may be made from a variety of thermoplastic polymeric materials including irradiated polyethylene, polypropylene, polyvinyl chloride and the like. Basically, these films possess a high degree of shrink energy due to the fact that the films have been molecularly oriented either monoaxially or biaxially. Upon the application of heat, there is sufficient memory in the film to cause the film to shrink toward its original dimensions.

A number of applications have been proposed for such films. One suitable application is for preparing "shrink covers" for flanged containers into which the product, such as foodstuffs, has been previously inserted. A suitable method has been proposed in the Dreyfus et al. U.S. Patent 2,976,655 which discloses the formation of such a shrink cover. By the application of heat to the film immediately adjacent the flange, the film shrinks into tightly fitting engagement with the flange, thus providing an effective, but easily removable cover. In my patent U.S. 3,175,027 I have proposed a method of making elastic film caps which may be used to make bowl covers or the like. In the method disclosed therein, the film is restrained and heat is applied to the margin so that after heating, if the restraint is immediately released, the effect on the film is similar to sewing an elastic thread under tension onto the fabric or film. The line along which the heat is applied thickens materially becoming several times thicker than the remaining area in the film. Consequently, the unheated panel area inside the heated peripheral zone is puckered into a cap shape.

It is an object of the invention to provide a novel package.

It is another object of the invention to provide a novel method for making a package employing heat shrinkable thermoplastic film.

It is another object of the invention to provide a product completely enclosed in a heat shrinkable film.

Still another object is to provide a novel method for heat shrinking and heat sealing thermoplastic film tightly about the product without applying heat directly to the product.

These and other objects of the invention will be readily apparent to those skilled in the art from the following disclosure and appended claims.

The invention has particular utility for wrapping nestable containers, such as drinking cups, plastic bowls, as well as single articles such as heads of lettuce or the like, in a manner which will confine the article, protect them, provide transparency and yet not require the subjection of the article to the heat of a shrink oven or the direct contact of sealing bars with the article.

I have now discovered that it is possible to sandwich an article between layers of film, heat seal the film layers immediately adjacent the articles, release the sealing pressure and cause the heat sealed areas only to shrink tightly against the periphery of the articles. By severing the film immediately adjacent the outside of the heat seal, a neat attractive package is obtained.

In one embodiment, the film is gathered close to the product prior to heat sealing so that upon subsequent shrinkage of the heat seal area, the film is radially taut on the package. Surprisingly, the residual heat in the heat seal is sufficient to cause a reduction in diameter in a circular seal of as much as 25 to 30%.

The invention is described by reference to the attached drawings.

FIGURE 1 illustrates in perspective a device for producing such packages automatically with a portion of the base removed to better illustrate the operable portions of the device.

FIGURE 2 is a partial cross-section of FIGURE 1.

FIGURE 3 is a perspective of the finished product.

FIGURE 4 is an enlargement of the bead portion of the finished package of FIGURE 3.

The invention is best described by reference to the drawing.

FIGURE 1 is a perspective view of a suitable device for producing a finished product by the method of the invention. A support 2 having an upper base 4 and a lower base 5 provides suitable support for the functional parts of the device. An orifice or aperture 18 having a configuration conforming to the peripheral configuration of the container 10 to be packaged is located in the base 4. Any suitable device for supporting the container may be employed such as pedestal 8 supported by an adjustable or telescoping rod 38 in a pipe 40 supported by collar 50 and attached to lower base 5. This pedestal 8 may be suitably adjusted to position the container 10 within the orifice 18 so that at least the upper portion of the container 10 is above the plane of the base 4. Prior to inserting the container 10 into the orifice 18 a layer of film 16 from a supply roll 17 is positioned over the opening 18. The supply roll may be supported on a shaft 15 journalled in brackets 42, 44. The container 10 is then placed on the film over opening 18 and forced downwardly to rest on pedestal 8. Preferably, opening 18 is only very slightly larger in diameter or cross-section than container 10 so that the film forced down around the container so as to snugly embrace the lower portion of the container. A second sheet of film 20 from a supply roll 21 on a shaft 19 journalled in brackets 42 and 44 is fed into the device and positioned over the container 10.

An upper member or platen 26 juxtapositioned above base member 4 contains an opening 46 immediately above opening 18 and corresponding in configuration thereto so as to press downwardly the film 20 into direct contact with the lower film 16. A means for heating the film is positioned on upper member 26 immediately adjacent a lower edge of the wall 47 of opening 46. A suitable heating means comprises an electrical resistant heating wire 14 suitably positioned on an insulating pad 6. The upper portion of the heat sealing means may be covered with a non-adherent coating 7 such as Teflon. The platen 26 is forced downwardly by any suitable means so that it forces the film 20 into intimate relationship with the lower film layer 16 and into close contact with the top of the container 10. The upper member may be driven by any suitable means such as by a hydraulic cylinder 32 having conduits 33 and 35 having fluid thereto and connected to platen 26 by piston rod 34 and collar 52. The cylinder assembly may be attached to lower support member 2 by bracket 36.

As shown in FIGURE 2 a suitable sponge rubber pad 24 or the like is positioned immediately adjacent an upper edge of the wall 49 of opening 18 and immediately below insulating pad 6. Consequently, the application of an electrical current through wires 60 (electrical source not shown) causes the two layers of film to be heat sealed together. Any suitable control panel 54 may be employed for adjusting the amount of heat and the dwell time. Simultaneously, with the heat sealing, the film may be severed peripherally of the heat seal and adjacent to the outer extremity of the resultant bead 56 leaving severed ends 58 of film 16 and 20. Any suitable means such as a knife 30 may be employed for severing. A suitable opening 31 is positioned immediately adjacent sponge rubber pad 24 and immediately below knife 30 so as to receive knife 30 for severing the film. The hot wire may also be employed for severing in lieu of a knife. Upon release of the downward pressure on platen 26 the platen is urged upwardly by any suitable means such as a plurality of spring members 28. Since the films 16 and 20 have been gathered onto the container 10 and additionally tightened due to the shrinkage of the bead, the film girth at the seal will be tightly drawn to the container. Depending on the shape of the container the film may also be gathered or puckered. By this method, it is possible to create a tight protective film covering on a container without the passing of same through a shrink tunnel.

It may be desirable to leave a small gap in the bead so as to provide an air escape vent. This may be accomplished by suitably insulating a portion of the electrical wire or by overlapping terminus ends of electrical wire, or by leaving a gap between the terminus ends of the electrical wires.

FIGURE 3 illustrates a finished container showing the bead snugly fitting the side of the container with the film drawn rather tightly against the container. The fit will not be skin tight as might be accomplished by passing the wrapped container through a high temperature shrink oven but will be most satisfactory for many uses. For example, nestable containers such as paper drinking cups which are susceptible to damage by elevated temperatures are successfully wrapped by the method of this invention.

FIGURE 4 illustrates in more detail the bead 56 and severed ends 58 and film and their relation to the container. Due to the controlled heating of only the bead portion of the film only the film in the bead will be deoriented. The remainder of the film remains highly oriented thus retaining the high strength characteristics of oriented film.

As an example, I employed a pair of horizontal sealing jaws each having a hole the size of the article in a central portion thereof. An electrical resistance wire was positioned around the opening of the lower sealing jaw. The article was held in a central position in the opening by a pedestal with a layer of film directly above and below the article. The film was sufficiently large so that the edges were outside the seal area. The sealing jaws were pressed together manually and the wire electrically heated by a timed pulse to fuse the film layers. The jaws were then immediately separated so that the hot seal could shrink in circumference against the article. About 25% shrink in diameter was obtained. The excess film was then cut off.

The distance between the severing means and heat seal means will determine the length of the band or skirt and can be adjusted as desired to produce any number of possible effects.

The location of the seal vertically is not critical, but preferably is positioned in an intermediate position of the product, such as equidistantly between the upper and lower extremities of the product.

The particular film employed is not critical but it is important that it possesses a high degree of shrink energy and shrink. A suitable film for purposes of this invention possesses the following properties:

(a) A film material which, when heated up to 96° C., will shrink at least 20% in each direction, (b) Its shrink energy, that is, the pull exerted during shrinking, should approximate 100 lbs. or more per square in cross-section, (c) The heat area, on cooling, should remain in a permanent elastic condition, that is, possessing the properties of extensibility and retractability associated with vulcanized rubber.

A suitable film is described in the patents to Baird et. al., U.S. Patent No. 3,022,543 and Rainer et al. U.S. Patent No. 2,877,500.

While certain examples, structures, and process steps have been described for purposes of illustration, the invention is not to be so limited. Variation and modification within the scope of the disclosure and the claims can readily be effected by those skilled in the art.

I claim:
1. A package comprising
   (a) an article,
   (b) a first biaxially oriented thermoplastic film completely and tightly enclosing the lower portion of said article,
   (c) a second biaxially oriented thermoplastic film completely and tightly enclosing the upper portion of said article,
   (d) an elastic thickened bead portion comprising a seal between said first and second films, said bead encircling completely the article intermediate its end portions, fitting the periphery of said article more tightly than the remaining portions of said films, and having substantially less orientation then the remaining portions of said films.
2. The package of claim 1 wherein said film comprises an irradiated, biaxially oriented polymer of ethylene having high shrink energy.
3. The package of claim 1 wherein said film is gathered adjacent said bead and forms a pleated effect in the remaining portions of said film.

References Cited

UNITED STATES PATENTS

| | | | |
|---|---|---|---|
| 1,685,392 | 9/1928 | Beadle. | |
| 3,131,810 | 5/1964 | Dreyfus | 206—46 |
| 3,133,387 | 5/1964 | Harrison | 53—30 |
| 3,188,215 | 6/1965 | Snow. | |

DAVID M. BOCKENEK, *Primary Examiner.*